United States Patent
Suzuki et al.

(10) Patent No.: US 7,865,352 B2
(45) Date of Patent: Jan. 4, 2011

(54) GENERATING GRAMMATICAL ELEMENTS IN NATURAL LANGUAGE SENTENCES

(75) Inventors: Hisami Suzuki, Redmond, WA (US); Kristina Toutanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/483,943

(22) Filed: Jul. 10, 2006

(65) Prior Publication Data

US 2007/0282596 A1    Dec. 6, 2007

Related U.S. Application Data

(60) Provisional application No. 60/810,410, filed on Jun. 2, 2006.

(51) Int. Cl.
*G06F 17/28* (2006.01)

(52) U.S. Cl. ............... 704/2; 704/1; 704/3; 704/4; 704/5; 704/7; 704/8; 704/9; 704/10; 715/256; 715/257; 715/264

(58) Field of Classification Search ............... 704/1–10; 715/256, 257, 264
See application file for complete search history.

(56) References Cited

U.S. PATENT DOCUMENTS

| | | | |
|---|---|---|---|
| 4,916,614 A * | 4/1990 | Kaji et al. | 704/2 |
| 5,406,480 A * | 4/1995 | Kanno | 704/10 |
| 5,425,129 A | 6/1995 | Garman et al. | 704/256 |
| 5,671,425 A * | 9/1997 | Suematsu | 704/9 |
| 5,687,383 A | 11/1997 | Nakayama | 395/752 |
| 5,696,980 A | 12/1997 | Brew | 395/752 |
| 5,930,746 A | 7/1999 | Ting | 704/9 |
| 6,243,670 B1 * | 6/2001 | Bessho et al. | 704/9 |
| 6,289,302 B1 * | 9/2001 | Kuo | 704/2 |
| 6,473,729 B1 | 10/2002 | Gastaldo et al. | 704/4 |
| 6,658,627 B1 | 12/2003 | Gallup | 707/536 |
| 6,778,949 B2 | 8/2004 | Duan et al. | 704/2 |
| 7,318,022 B2 * | 1/2008 | Li | 704/10 |
| 7,672,829 B2 * | 3/2010 | Ishikura | 704/2 |
| 2002/0128819 A1 * | 9/2002 | Jessee et al. | 704/10 |
| 2002/0169592 A1 | 11/2002 | Aityan | 704/7 |
| 2003/0004915 A1 | 1/2003 | Lin | 704/10 |
| 2003/0023423 A1 * | 1/2003 | Yamada et al. | 704/2 |
| 2003/0055626 A1 | 3/2003 | Miyahira | 704/9 |
| 2003/0187644 A1 | 10/2003 | Mohri et al. | 704/256 |
| 2003/0204400 A1 | 10/2003 | Marcu | 704/7 |
| 2004/0193401 A1 * | 9/2004 | Ringger et al. | 704/9 |
| 2004/0205671 A1 | 10/2004 | Sukehiro | 704/10 |
| 2005/0038643 A1 | 2/2005 | Koehn | |

(Continued)

OTHER PUBLICATIONS

Toutanova, Effective statistical models for syntactic and semantic disambiguation, http://nlp.stanford.edu/kristina/papers/thesis.pdf, Sep. 5, 2005, pp. 1-170, especially pp. 76-94.*

(Continued)

*Primary Examiner*—David R Hudspeth
*Assistant Examiner*—Lamont M Spooner
(74) *Attorney, Agent, or Firm*—Christopher J. Volkmann; Westman, Champlin & Kelly, P.A.

(57) ABSTRACT

Grammatical element prediction is used to predict grammatical elements in text fragments (such as phrases or sentences). In one embodiment, a statistical model, using syntax features, is used to predict grammatical elements.

14 Claims, 4 Drawing Sheets

U.S. PATENT DOCUMENTS

| | | | |
|---|---|---|---|
| 2005/0049851 A1 | 3/2005 | Watanabe | 704/4 |
| 2006/0282255 A1 | 12/2006 | Lu et al. | 704/2 |
| 2007/0083357 A1* | 4/2007 | Moore et al. | 704/4 |
| 2007/0282590 A1 | 12/2007 | Suzuki et al. | |

OTHER PUBLICATIONS

Hajic et al., "Natural Language Generation in the Context of Machine Translation", Technical report, Center for Language and Speech Processing, Johns Hopkins University, 2002, Summer Workshop.

Och et al., "A Smorgasbord of Features for Statistical Machine Translation", NAACL, 2004.

"Evaluation of a Japanese GFG Derived fro a Syntactically Annotated Corpus with Respect to Dependency Measures" by: Tomoya Noro et al., Tokyo pp. 9-16, 2005.

"Inferring Attribute Grammars with Structured Data for Natural Language Processing" by: Bradford Starkie, Australia, 12 pages, 2002.

"A Paraphrase-Based Exploration of Cohesiveness Criteria" by: Inui Kentaro et al. Japan, 10 pages, 2001.

"A Hybrid Japanese Parser with Hand-crafted Grammar and Stattistics" by: Hiroshi Kanayama et al. Japan, 7 pages, 2000.

"Automated Postediting of Documents" by: Kevin Knight et al. 1994 6 pages.

"Memory-based Learning for Article Generation" In Proceedings of CoNLL-2000, p. 43-48, Libson, Portugal 2000 by: Guido Minnen et al. 6 pages.

"Automatic Article Restoration" by John Lee 2004 6 pages.

U.S. Appl. No. 11/504,285 Office Action mailed Feb. 1, 2010.

* cited by examiner

GENERATING GRAMMATICAL ELEMENTS IN NATURAL LANGUAGE SENTENCES

The present application is based on and claims the benefit of U.S. provisional patent application Ser. No. 60/810,410, filed Jun. 2, 2006, the content of which is hereby incorporated by reference in its entirety.

BACKGROUND

Grammatical elements include function words, which are those words that do not have semantic meaning in a text fragment. An example of such function words are Japanese case markers, which indicate grammatical relations (such as subject, object, and location) of the complement noun phrase to the predicate. Other grammatical elements include inflections, such as inflections to indicate number, tense, gender, etc. For instance, the ending of the word "come" changes based on the number of the noun associated with it (i.e., I come, she comes).

Generation of grammatical elements using natural language processing technology has become important. This is particularly true in the context of machine translation. In an English-to-Japanese machine translation system, for example, Japanese case markers are among the most difficult to generate appropriately. This is because the case markers often do not correspond to any word in the source language (in English), since many grammatical relations are expressed by word order in English.

Generating Japanese case markers is also difficult because the mapping between the case markers and the grammatical relations they express is very complex. For the same reasons, generation of case markers is challenging to foreign language learners.

This difficulty in generation, however, does not mean that the choice of case markers is insignificant. When a generated sentence contains mistakes in grammatical elements, those mistakes often lead to severe unintelligibility, which sometimes results in a different semantic interpretation from the intended one. The same is true not only of case markers, but of substantially all grammatical elements.

An example is helpful in showing how difficult it is to reliably predict grammatical elements. The example is in predicting case markers in Japanese using the information that exists only in the rest of the sentence.

The following is an example of a Japanese translation of the phrase "(He) has idolized Einstein since (he was) little." The first line shows the Japanese characters, the second line shows the characters phonetically spelled using the English alphabet, and the third line shows the English translation of the characters. The sentence contains two case markers, "kara" which means "from" and "ni" which does not correspond to any word in English.

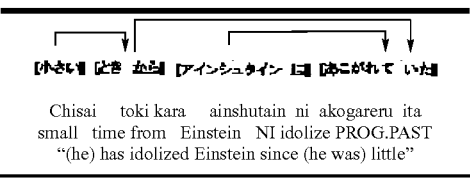

Chisai toki kara ainshutain ni akogareru ita
small time from Einstein NI idolize PROG.PAST
"(he) has idolized Einstein since (he was) little"

In the example, square brackets indicate phrase, or "bunsetsu" boundaries, and arrows between phrases indicate dependency relations.

In order to predict the case markers in this sentence, there are multiple valid answers for each decision, many of which correspond to different semantic relations. For example, for the first case marker slot in the example, which is currently filled by "kara", other grammatical elements "wa" (which is a topic marker) and "ni" which means "in", or no case marker at all, are all reasonable choices. Other markers, such as "wo" (which is an object marker), "de" which means "at", or "made" which means "until", etc., are not considered reasonable.

For the second grammatical case marker slot filled by "ni", other case markers such as "ga" (which is a subject marker) are also grammatically reasonable choices, making "Einstein" the subject of "idolize", thus changing the meaning of the sentence.

As is apparent from this example, the choice among the correct answers is determined by the speaker's intent in uttering the sentence, and is therefore very difficult to recover from the content words of the sentence structure alone.

The discussion above is merely provided for general background information and is not intended to be used as an aid in determining the scope of the claimed subject matter.

SUMMARY

Grammatical element prediction is used to predict grammatical elements in text fragments (such as phrases or sentences). In one embodiment, a statistical model, using syntax features, is used to predict grammatical elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
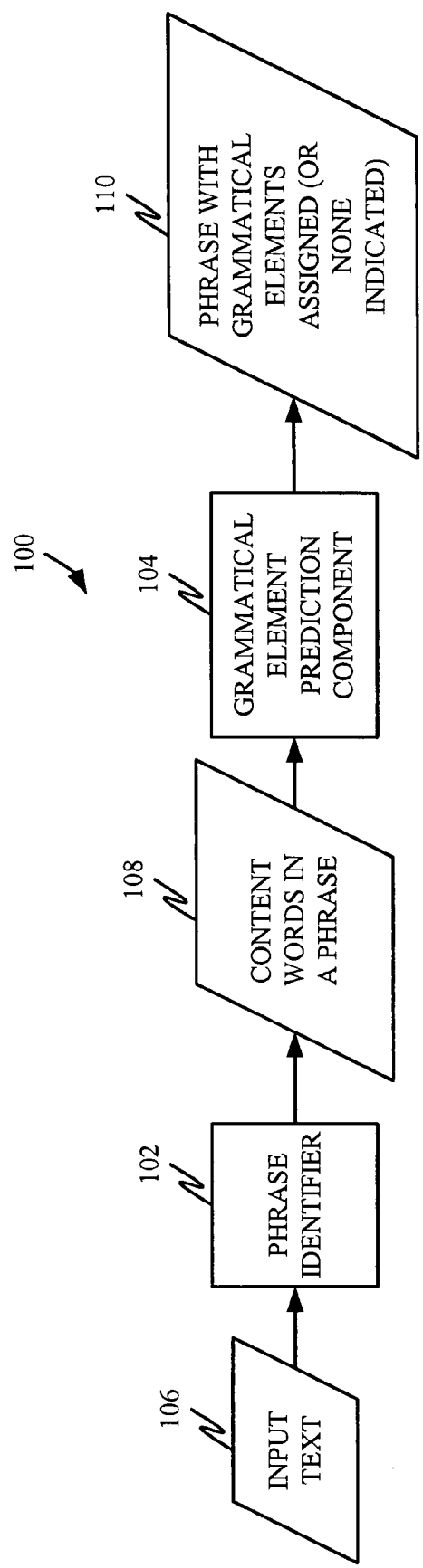
FIG. 1 is a block diagram of one embodiment of a grammatical element generation system.

The present invention can be used to predict and generate grammatical elements. For the sake of the present exemplary discussion, the grammatical elements being predicted are Japanese case markers. Of course, the present invention is not to be so limited and other grammatical elements could similarly be predicted and generated as well, such as inflection for number, case, gender, etc., as well as these and other grammatical elements for many different languages, other than simply Japanese and English. However, again for the purpose of example only, the present discussion will proceed with respect to predicting and generating Japanese case markers as the grammatical elements under consideration.

Before describing the present invention in more detail, a brief discussion of Japanese case markers will be helpful. Conventionally, Japanese nominal postpositions are classified into the following three categories: case particles, conjunctive particles, and focus particles. Case particles, or case markers, indicate grammatical relations of the compliment noun phrase to the predicate. As they are jointly determined by the noun phrase in the predicate, case markers do not allow simple mapping to a word in another language, which makes their generation more difficult. A relationship between the case marker and the grammatical relation it indicates is not straightforward either. A case marker can (and often does) indicate multiple grammatical relations as in "Ainshutain-ni akogareru", which means "idolize Einstein" where "ni" marks the Object relation and in "Tokyo-ni sumu" which means "live in Tokyo" where "ni" indicates Location. Conversely, the same grammatical relation may be indicated by different case markers. Both "ni" and "de" in "Tokyo-ni sumu" (live in Tokyo) and "Tokyo-de au" (meet in Tokyo) indicate the Location relation.

Ten case markers are used as a primary target of the prediction task discussed herein. Those ten case markers are shown in the first ten lines of Table 1 below.

TABLE 1

| case markers | | grammatical functions (e.g.) | +wa |
|---|---|---|---|
| が | ga | subject; object | |
| を | wo | object; path | |
| の | no | genitive; subject | |
| に | ni | dative object, location | ✓ |
| から | kara | source | ✓ |
| と | to | quotative, reciprocal, as | ✓ |
| で | de | location, instrument, cause | ✓ |
| へ | e | goal, direction | ✓ |
| まで | made | goal (up to, until) | ✓ |
| より | yori | source, object of comparison | ✓ |
| は | wa | topic | |

Focus particles add focus to a phrase against a given background or contextual knowledge. For example "shika" and "mo" in "pasuta-shika tabenakatta" means "ate only pasta" and "pasuta-mo tabeta" means "also ate pasta." The focus particles correspond to "only" and "also", respectively. It will be noted that focus particles often replace case markers. In the above two examples, the object marker "wo" is no longer present when "shika" or "mo" is used.

For purposes of the present exemplary discussion, the only focus particle predicted is the topic marker "wa". Unlike other focus particles, such as "shika" and "mo", "wa" does not translate into any word in English, which makes it difficult to generate by using information from the source language. In addition, some linguists recognize "wa" as a topic marker separately from other focus particles. The main function of "wa" is to introduce a topic in the sentence, which is to some extent predictable from the structure of the sentence itself.

Therefore, in addition to the ten true case markers set out in Table 1 above, the term "wa" is also included as a case marker. In addition, the combination of case particles plus "wa" as a secondary target of prediction is also included. The case markers that can appear followed by "wa" are indicated by a check mark in the column "+wa" in Table 1. Thus, there are seven secondary prediction targets: "niwa", "karawa", "towa", "dewa", "ewa", "madewa", and "yoriwa". Therefore, for purposes of the present example, there are a total of eighteen case particles to assign to phrases.

Conjunctive particles are used to conjoin words and phrases, corresponding to English "and" and "or". It will be noted, of course, that the present system can be extended to include conjunctive particles as well as other focus particles (other than "wa"), but for the sake of the present example, these are not included as prediction targets.

FIG. 1 is a block diagram of a grammatical element prediction system 100 in accordance with one embodiment. System 100 includes optional phrase identifier 102 and grammatical element prediction component 104. The overall structure of system 100 is the same whether the grammatical elements being predicted are Japanese case markers, or other grammatical elements or combinations of different grammatical elements. The discussion simply proceeds with respect to Japanese case markers for the sake of example.

Generally, an input text 106 is provided to phrase identifier 102. Phrase identifier can illustratively be any natural language processing component that can identify phrases that include content words, and those content words 108 are provided to grammatical element prediction component 104. Grammatical element prediction component 104 predicts the grammatical elements that are to be assigned to the phrase (or determines that none are indicated) and provides an output indicative of the phrase with the grammatical elements assigned, or an indication that none are to be assigned. The output is indicated generally by 110 in FIG. 1.

Figure 2:
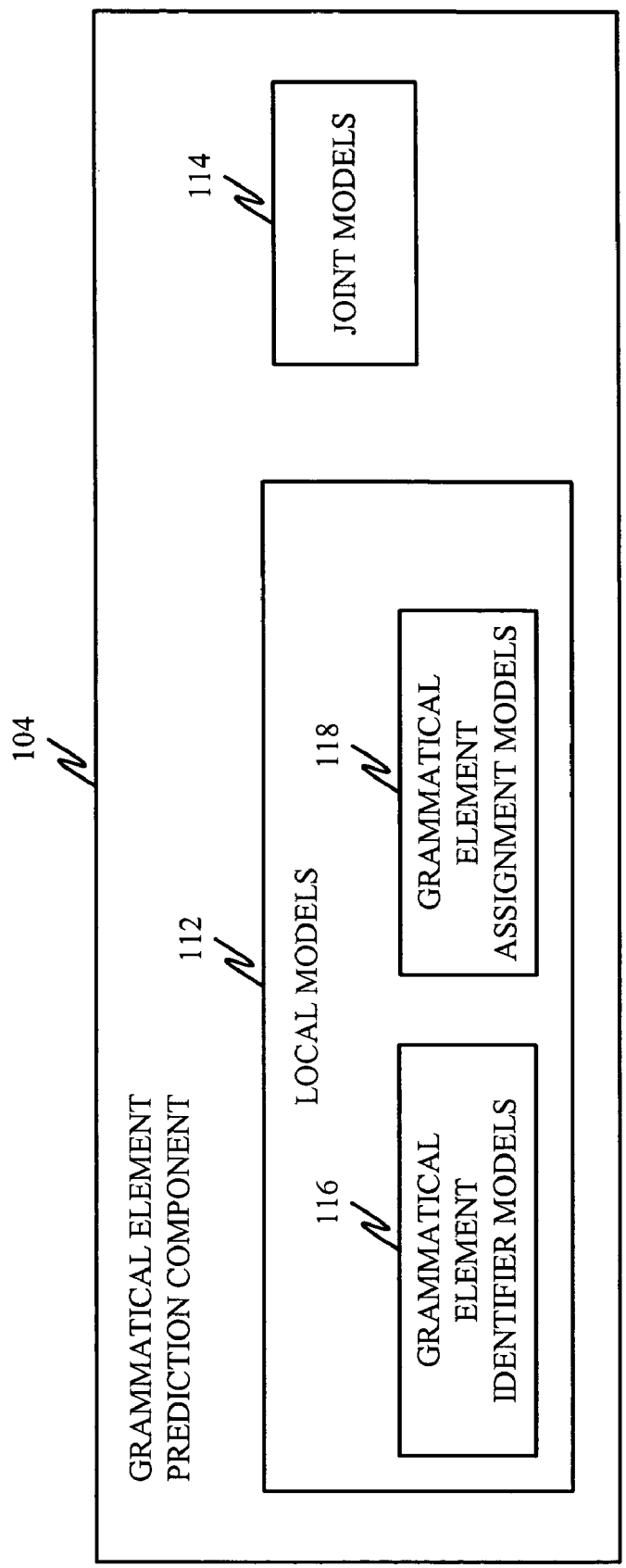
FIG. 2 is a more detailed block diagram of one embodiment of a grammatical element prediction component.

FIG. 2 is a more detailed block diagram of one embodiment of grammatical element prediction component 104. In the embodiment shown in FIG. 2, grammatical element prediction component 104 includes a set of local models 112 and a joint model 114. The set of local models 112 includes grammatical element identifier model 116, and grammatical element assignment model 118. A set of local models 112 chooses or predicts the case marker of each phrase independently of the case markers of other phrases. Joint model 114 chooses or predicts the case markers of a phrase based on the prediction made on other phrases. Development and training of the local and joint models 112 and 114 is discussed in greater deal below.

Figure 3:
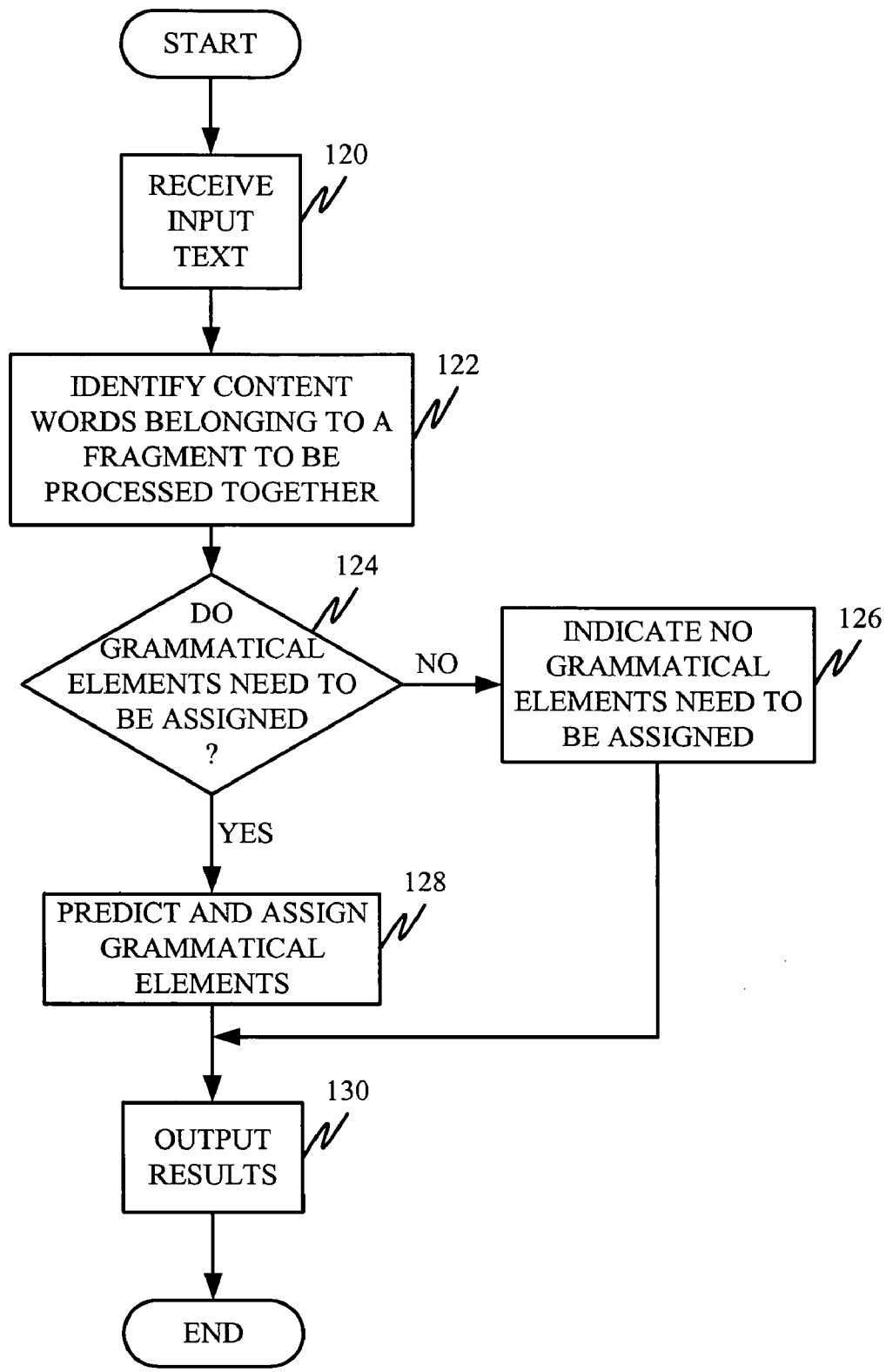
FIG. 3 is a flow diagram illustrating one embodiment of the operation of the system shown in FIG. 1.

FIG. 3 is a flow diagram illustrating the operation of system 100, using grammatical element prediction component 104 shown in FIG. 2, in more detail. The input text 106 is first received by system 100. This is indicated by block 120 in FIG. 3. In one embodiment, the input text is a Japanese sentence which is formed of a list of phrases (or in Japanese, "bunsetsu"). Each phrase illustratively includes one content word (or n-content words in the case of compound phrases with n-components) plus any number of function words (including particles, auxiliaries and affixes, etc.).

Phrase identifier 102 then identifies in the input text 106 content words that are to be processed together as a single text fragment, or phrase. This is indicated by block 122. This, of course, is optional because the grammatical element prediction component 104 can operate on words as well, in which case only words in input text 106 need to be identified. In one embodiment, case markers are classified as function words, and there is one case marker per phrase, with the exception that "no" can appear after certain case markers, in which case "no" can be considered to be the case for the phrase.

The content words 108 for which case markers are to be assigned are then provided to grammatical element prediction component 104, for the prediction and assignment of case to each content word or set of content words, in a phrase. It will be noted of course that, if the input to system 100 is simply a phrase, then phrase identifier 102 need not be used.

In any case, grammatical element prediction component 104 in one illustrative embodiment, divides case prediction into the separate tasks of case identification, and classification. These can be treated as one task as well (as is discussed in more detail below), but for the purpose of this illustrative embodiment, they are treated as separate tasks. In the identification task, grammatical element prediction component 104 determines whether the phrase being considered is to be assigned the label "HasCase" meaning that the phrase should be assigned a case marker or "None" meaning that it should not have a case marker. FIG. 2 shows that local models 112 include grammatical element identifier model 116 (that performs case identification) and grammatical element assignment model 118 (that performs classification). Thus, grammatical element identifier model 116 determines whether the input phrase being processed needs to be assigned a grammatical element. This is also indicated by block 124 in FIG. 3.

If no grammatical element needs to be assigned to the phrase under consideration, then grammatical element prediction component 104 provides output 110 which includes an indicator, along with the phrase under consideration, that no grammatical element needs to be assigned to the phrase. This is indicated by block 126 in FIG. 3.

However, if, at block 124 in FIG. 3, a grammatical element (e.g., case) does need to be assigned to the phrase under consideration, then grammatical element assignment model 118 and joint model 114 (both shown in FIG. 2) are used to predict and assign case to the phrase under consideration. Prediction and assignment of that grammatical element is indicated by block 128 in FIG. 3. Grammatical element prediction component 104 then outputs the result which, in one embodiment, is the phrase under consideration along with either the grammatical element or elements assigned, or the indication that no grammatical element is to be assigned. Outputting the result is indicated by block 130 in FIG. 3.

In another embodiment, even if local models 112 indicate that no grammatical element needs to be assigned, joint models 114 are applied and can make a determination that a grammatical element does need to be assigned. The determination by joint model 114 can override the determination by local models 112. Similarly, local models 116 and 118 need not be applied in sequence (116 followed by 118). Instead, they can be combined, such as by combining their probability distributions, and the top N assignments can be identified for re-scoring. This embodiment is discussed in greater detail below.

In one embodiment, the local identifier model 116 and assignment model 118 are classifiers. In the embodiment in which they are combined into a single model, the model can be a single multi-class classifier. Some examples of local model features used in training the classifiers that embody the identification and classification models are listed in Table 2, although these are exemplary and not intended to limit the features in any way. The features in Table 2 include features for a phrase, for its parent phrase and for their relations. They can be syntactically-motivated features obtained from manually annotated data, or otherwise. They can include n-gram features only one feature (GrandparentNounSubPos) shown in Table 2 refers to the grandparent of the phrase, and all other features are between the phrase, its parent and its sibling nodes, and are a superset of the dependency-based features in a variety of known semantic role labeling systems that use dependency tree structures. They can also be features of dependency pairs themselves, such as dependency type, distance between parent and child nodes, etc. In addition to the exemplary features shown at the top portion of Table 2, additional combined features are listed at the bottom portion of Table 2.

TABLE 2

| Basic features for phrases (self, parent) |
| --- |
| HeadPOS, PrevHeadPOS, NextHeadPOS |
| PrevPOS, Prev2POS, NextPOS, Next2POS |
| HeadNounSubPos: time, formal nouns, adverbial |
| HeadLemma |
| HeadWord, PrevHeadWord, NextHeadWord |
| PrevWord, Prev2Word, NextWord, Next2Word |

TABLE 2-continued

| |
| --- |
| LastWordLemma (excluding case markers) |
| LastWordInfl (excluding case markers) |
| IsFiniteClause |
| IsDateExpression |
| IsNumberExpression |
| HasPredicateNominal |
| HasNominalizer |
| HasPunctuation: comma, period |
| HasFiniteClausalModifier |
| RelativePosition: sole, first, mid, last |
| NSiblings (number of siblings) |
| Position (absolute position among siblings) |
| Voice: pass, caus, passcaus |
| Negation |
| Basic features for phrase relations (parent-child pair) |
| DependencyType: D, P, A, I |
| Distance: linear distance in bunsetsu, 1, 2-5, >6 |
| Subcat: POS tag of parent + POS tag of all children + indication for current |
| Combined features (selected) |
| HeadPOS + HeadLemma |
| ParentLemma + HeadLemma |
| Position + NSiblings |
| IsFiniteClause + GrandparentNounSubPos |

In one embodiment (in which models 116 and 118 are separate classifiers), grammatical element identifier model 116, which determines whether a grammatical element is to be assigned to a phrase or not, is trained as a binary classifier using the features shown in Table 2. In that same embodiment, grammatical element assignment model 118, which assigns one of the 18 grammatical elements to the phrase under consideration, is trained as a multi-class classifier (with 18 classes). In the embodiment in which models 116 and 118 are combined, a classifier for the complete class (i.e., a classifier for both local models 112, which includes a combination of model 116 and model 118) can be obtained by combining the two classifiers 116 and 118. In order to do this, let $P_{ID}(c/b)$ and $P_{CLS}(c/b)$ denote the probability of class c for a phrase (in Japanese "bunsetsu") b according to the identification and classification models, respectively. The probability distribution over classes of the complete model for case assignment is defined as follows:

$$P_{CASEASSIGN}(None|b) = P_{ID}(None/b) \quad \text{Eq. 1}$$

$$P_{CASEASSIGN}(l|b) = P_{ID}(HasCase/b) * P_{CLS}(l/b) \quad \text{Eq. 2}$$

Where None means that no case is to be assigned;
HasCase means that a case is to be assigned; and
l denotes one of the 18 case markers.

In the illustrative embodiment, the decomposition set out in Equations 1 and 2 is used mainly for efficiency in training. In other words, the decomposition allows the classification models to be trained on a subset of training examples that are comprised only of those phrases that have a case marker. The decomposition also allows the use of different sets of features for identification and assignment. There are a variety of known machine learning methods that can be used to train the classifiers. In one embodiment, log-linear models for both identification and classification are used, since they produce probability distributions that allow chaining of the two component models, and easy integration into a machine translation system.

Joint model 114 is now described in more detail. For joint model 114, only two types of features are used, in accordance with one embodiment. A first feature is referred to as a "sequence" feature and is indicative of a sequence of non- None case markers for a set of sister phrases. The second feature is the "repetition" feature and is indicative of a repetition of non-None case makers. These features capture regularities in the sequence of case markers of phrases that modify the same head phrase. Thus, joint model 114 is a classifier that takes into account the labels of other phrases when classifying a given phrase under consideration. This improves performance because the argument structure in such phrases is a joint structure, with strong dependencies among arguments. Since the case markers also reflect the argument structure to some extent, the joint classifier improves case prediction and is thus implemented in accordance with one embodiment. It is also believed that the joint classifier improves prediction of inflected forms that participate in the grammatical phenomenon of agreement.

In accordance with another embodiment, the joint model (or classifier) 114 is used to implement n-best reranking. In other words, the n-best (in one illustrative embodiment (n=5) although other values for n can be used) case assignment sequence candidates are generated for a set of sister phrases using the local models 112. These n-best candidates are used to train a joint classifier that learns to choose the best candidate from the set of sisters.

In one illustrative embodiment, all of the features used for both local models 116 and 118 and joint model 114, are binary features. That is, when the value of a feature is not binary the combination of the feature name plus the value is treated as a unique feature. In the illustrative embodiment, the models were all trained using known training techniques for log-linear models with a Gaussian prior.

In yet another embodiment, joint models 114 and local models 112 are combined into a single model (depicted in FIG. 2 by box 104). The single model may be more computationally expensive, but more accurate.

It can thus be seen that the present models that use syntactic dependency-based features can be used to effectively predict grammatical elements, such as case markers. Of course, other grammatical elements can be predicted as well, and case markers are discussed for the sake of example only.

Figure 4:
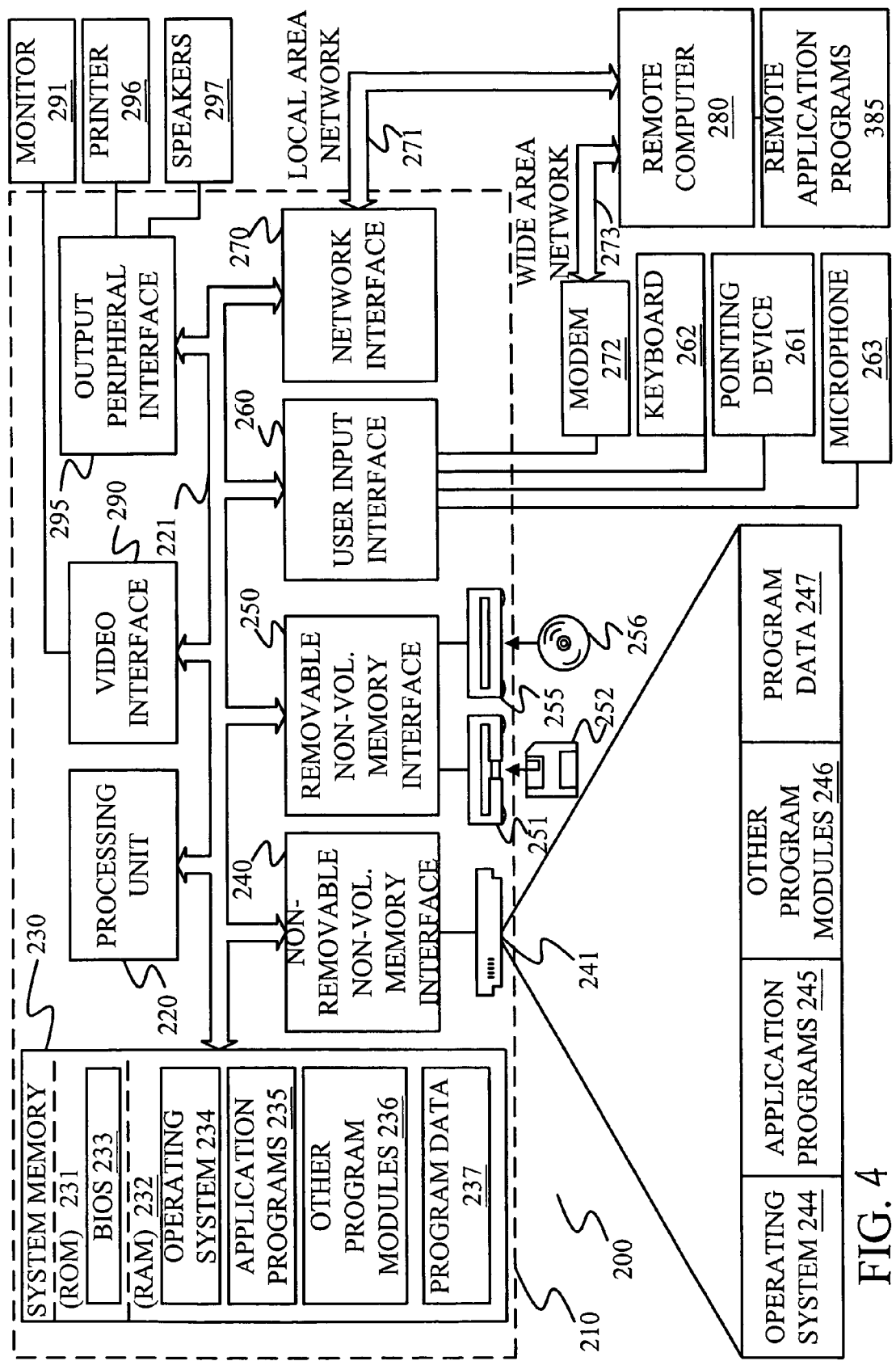
FIG. 4 is a block diagram of one illustrative operating environment.

One illustrative computing environment will now be described. FIG. 4 illustrates an example of a suitable computing system environment 200 on which embodiments may be implemented. The computing system environment 200 is only one example of a suitable computing environment and is not intended to suggest any limitation as to the scope of use or functionality of the claimed subject matter. Neither should the computing environment 200 be interpreted as having any dependency or requirement relating to any one or combination of components illustrated in the exemplary operating environment 200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, application programs 235, other program modules 236, and program data 237.

The computer 210 may also include other removable/non-removable volatile/nonvolatile computer storage media. By way of example only, FIG. 4 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 4, provide storage of computer readable instructions, data structures, program modules and other data for the computer 210. In FIG. 4, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 4 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 4 illustrates remote application programs 285 as residing on remote computer 280. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for assigning grammatical elements to a textual input comprising a phrase selected from a plurality of phrases, the system comprising:

a grammatical element prediction component implemented on a processor of a computing device, the grammatical element prediction component comprising:

at least one statistical local model configured to determine whether a grammatical element is to be assigned to the selected phrase and, if so, to identify at least one of a plurality of different grammatical elements to be assigned to the selected phrase, the grammatical elements identified by the at least one statistical local model comprising at least one of function words, case markers, and inflections, wherein the at least one statistical local model identifies the at least one grammatical element based on the selected phrase independent of other phrases of the plurality of phrases; and a statistical joint model that is separate from the at least one statistical local model and is configured to determine whether a grammatical element is to be assigned to the selected phrase and, if so, to identify at least one of a plurality of different grammatical elements to be assigned to the selected phrase, the grammatical elements identified by the statistical joint model comprising at least one of function words, case markers, and inflections, wherein the statistical joint model identifies the at least one grammatical element to be assigned to the selected phrase based on grammatical elements assigned to at least one other phrase of the plurality of phrases by at least one statistical local model; and an output component configured to output at least one of the selected phrase with an assigned grammatical element and an indication that no grammatical element is assigned to the selected phrase.

2. The system of claim 1 wherein the at least one statistical local model comprises:

a set of statistical local models that predict whether a grammatical element is to be assigned to the selected phrase and, if so, to predict the at least one grammatical element based on syntactic features of the selected phrase itself.

3. The system of claim 2 wherein the at least one local model comprises:

a grammatical element identifier model configured to indicate whether a grammatical element is to be assigned to the selected phrase; and a grammatical element assignment model configured to indicate the at least one grammatical element to be assigned to the selected phrase when the grammatical element identifier model indicates that a grammatical element is to be assigned.

4. The system of claim 3 wherein the grammatical element identifier model is a two class classifier, and wherein the grammatical element assignment model is a multi-class classifier having a number of classes at least as great as a number of the plurality of different grammatical elements.

5. The system of claim 1 wherein the at least one statistical local model comprises a single model that predicts whether a grammatical element is to be predicted and assigns the at least one grammatical element to the selected phrase.

6. The system of claim 1 wherein the grammatical element prediction component is configured to provide, as an output, the selected phrase with assigned grammatical elements.

7. The system of claim 1 and further comprising:
a natural language processor configured to receive an input sentence and parse the input sentence into the plurality of phrases.

8. A computer-implemented method of determining grammatical elements to be assigned to a textual input, the method comprising:
receiving the textual input and parsing the textual input into a plurality of textual phrases;
for each of the plurality of textual phrases,
using a processor of the computer to implement at least one statistical local model comprising a grammatical element identifier model and a grammatical element assignment model, wherein the grammatical element identifier model is utilized to determine whether a grammatical element is to be assigned to the textual phrase and, if so, the grammatical element assignment model is utilized to identify at least one of a plurality of different grammatical elements to be assigned to the textual phrase, wherein the at least one statistical local model identifies the at least one grammatical element to be assigned to the textual phrase based on syntactic features of the textual phrase independent of grammatical elements identified to be assigned to the other textual phrases of the plurality of textual phrases, wherein the grammatical element identifier model comprises a two class classifier and the grammatical element assignment model comprises a multi-class classifier having a number of classes at least as great as a number of the plurality of different grammatical elements; and
using the processor of the computer to implement a statistical joint model configured to determine whether a grammatical element is to be assigned to the textual phrase and, if so, to identify at least one of the plurality of different grammatical elements to be assigned to the textual phrase, wherein the statistical joint model identifies the at least one grammatical element to be assigned to the textual phrase based on grammatical elements identified in the other textual phrases of the plurality of textual phrases; and
outputting a selected text phrase along with an indication of a grammatical element assigned to it.

9. The method of claim 8 wherein the first and second statistical models are classifiers.

10. The method of claim 8 wherein outputting comprises:
outputting the selected text phrase with the identified grammatical element placed within the selected text phrase.

11. The method of claim 8 wherein the textual input comprises a plurality of content words, wherein parsing comprises:
parsing the textual input into the plurality of phrases based on the content words.

12. The method of claim 11 wherein outputting comprises:
outputting the selected textual phrase including both a content word included in the selected textual phrase and the identified grammatical element assigned to the selected textual phrase.

13. A computer readable storage medium storing instructions which, when executed by a computer, cause the computer to perform steps of:
receiving a textual input comprising a text fragment selected from a plurality of text fragments;
accessing a plurality of stored statistical grammatical element prediction models configured to assign grammatical elements comprising one or more of case markers, postpositions, prepositions, articles, function words, and inflections, wherein accessing comprises:
accessing a first statistical local model configured to determine whether a grammatical element is to be assigned to the selected text fragment and, if so, to identify at least one of a plurality of different grammatical elements to be assigned to the selected text fragment, wherein the first statistical local model identifies the at least one grammatical element based on the selected text fragment independent of grammatical elements identified to be assigned to other text fragments of the plurality of text fragments; and
accessing a second statistical joint model configured to determine whether a grammatical element is to be assigned to the selected text fragment and, if so, to identify at least one of a plurality of different grammatical elements to be assigned to the selected text fragment, wherein the second statistical model identifies the at least one grammatical element based on the selected text fragment and at least one grammatical element identified to be assigned to another text fragment of the plurality of text fragments;
predicting, using a processor of the computer, grammatical elements for the selected text fragment using the stored statistical grammatical element prediction models including the first and second statistical models, wherein predicting comprises combining probability distributions of the first and second statistical models; and
outputting the selected text fragment along with an indication of the predicted grammatical element.

14. The computer readable storage medium of claim 13 wherein accessing a plurality of stored statistical grammatical element prediction models comprises:
accessing a set of local models that determine whether the selected text fragment is to have a grammatical element predicted for it and, if so, to predict a grammatical element, based on features of the selected text fragment itself; and
accessing a joint model that predicts a grammatical element for the selected text fragment based on grammatical elements predicted for at least one other text fragment of the plurality of text fragments.

* * * * *